(12) United States Patent
Baskaran

(10) Patent No.: US 9,571,469 B2
(45) Date of Patent: Feb. 14, 2017

(54) COMPUTER IMPLEMENTED SYSTEM AND METHOD FOR AHEAD-OF-TIME DELIVERY OF ELECTRONIC CONTENT

(71) Applicant: Prakash Baskaran, Ashburn, VA (US)

(72) Inventor: Prakash Baskaran, Ashburn, VA (US)

(73) Assignee: PAWAA SOFTWARE PRIVATE LIMITED, Karnataka (IN)

( * ) Notice: Subject to any disclaimer, the term of this patent is extended or adjusted under 35 U.S.C. 154(b) by 23 days.

(21) Appl. No.: 14/639,822

(22) Filed: Mar. 5, 2015

(65) Prior Publication Data
US 2016/0261567 A1 Sep. 8, 2016

(51) Int. Cl.
*H04L 29/06* (2006.01)
*H04L 29/08* (2006.01)
*H04L 9/08* (2006.01)

(52) U.S. Cl.
CPC ........... *H04L 63/0428* (2013.01); *H04L 9/088* (2013.01); *H04L 67/06* (2013.01)

(58) Field of Classification Search
CPC .......... H04L 29/06; G06F 21/10; G06F 21/51; G06F 21/602; G06F 21/6209
USPC ................... 713/165; 726/1, 5, 26
See application file for complete search history.

(56) References Cited

U.S. PATENT DOCUMENTS

| | | | | |
|---|---|---|---|---|
| 6,889,212 B1* | 5/2005 | Wang | | G06Q 30/06 370/259 |
| 9,009,857 B2* | 4/2015 | Bestmann | | 705/51 |
| 2007/0074270 A1* | 3/2007 | Meehan | | G06F 21/10 726/2 |
| 2009/0094673 A1* | 4/2009 | Seguin | | G06F 21/51 726/1 |
| 2011/0271103 A1* | 11/2011 | Shur | | G06F 21/10 713/165 |
| 2013/0097421 A1* | 4/2013 | Lim | | G06F 21/602 713/167 |

* cited by examiner

*Primary Examiner* — Hadi Armouche
*Assistant Examiner* — Hee Song
(74) *Attorney, Agent, or Firm* — Barry Choobin; Patent 360 LLC

(57) ABSTRACT

A computer implemented system, method and a computer program product for ahead of time delivery of electronic content, have been provided. A file policy specifying a time period in which the electronic content is to be rendered accessible to a subscriber, is created. The electronic content is embedded with the file access policy, and subsequently encrypted. The encrypted electronic content is transmitted ahead-of-time to a network enabled device accessible to the subscriber. The encrypted electronic content is decrypted subsequent to the authentication of the subscriber. The electronic content is made accessible via the network enabled device only in the event that the current time stamp received from a time server is within the time period specified by the file access policy.

10 Claims, 3 Drawing Sheets

Figure 1:
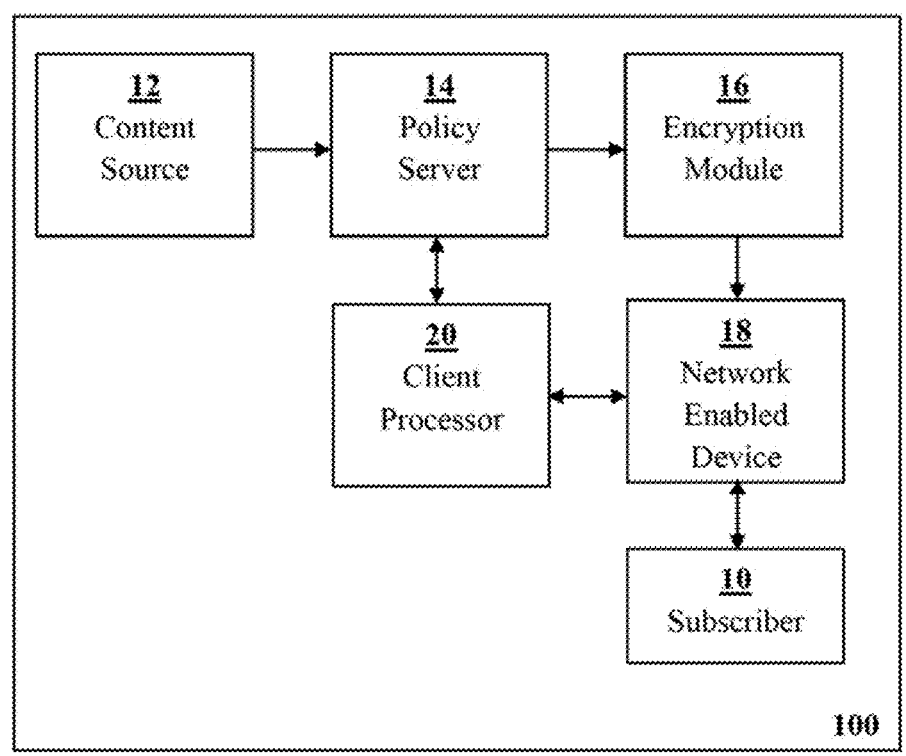

COMPUTER IMPLEMENTED SYSTEM AND METHOD FOR AHEAD-OF-TIME DELIVERY OF ELECTRONIC CONTENT

BACKGROUND

Technical Field

The embodiments herein relate to the held of data transmission and distribution. Particularly, the embodiments herein relate to systems and methods that enable ahead-of-time delivery of data/content to a subscriber/intended content recipient.

Description of Related Art

Information security and information rights management are critical aspects for an enterprise that seeks to protect valuable information from being accessed and probably misused by unauthorized users. Apart from securing the available information, an enterprise would also have to emphasize upon was in which the information could be shared with authorized users who are in need of the said information, and also upon ensuring that the information is transmitted to multiple authorized users, in a safe and secured manner. One of the traditional approaches for delivering information in a secured manner to a plurality of users, warranted for the information to be encrypted prior to distribution and delivering a key, preferably a public key which would facilitate decryption of the distributed (encrypted) information.

However, one of the drawbacks associated with the aforementioned approach is the obligation to deliver a key to each of the plurality of recipients, which in turn could jeopardize the security offered to the transmitted information.

Therefore, there was felt a need for a system that could securely transmit the information without warranting the key to be transmitted to each of the intended content recipients. There was also felt a need for a system that would enable an authorized intent content recipient to access the transmitted information, only at a predetermined time.

The above mentioned shortcomings, disadvantages and problems are addressed herein and which will be understood by reading and studying the following specification.

OBJECTIVES OF THE EMBODIMENTS

The primary object of the embodiments herein is to provide a system that transmits information to the intended recipients, ahead-of-time.

Another object of the embodiments herein is to provide a system that renders the transmitted information accessible only at a pre-determined future time.

Yet another object of the embodiments herein is to provide a time synchronized authentication mechanism for identifying and authorizing intended content recipients.

Yet another object of the embodiments herein is to provide a system that provides for centralized authorization policy management.

Yet another object of the embodiments herein is to provide a system that executes a time synchronized authentication mechanism on a standalone client device irrespective of the time stamps locally generated by the client device.

These and other objects and advantages of the embodiments herein will become readily apparent from the following detailed description taken in conjunction with the accompanying drawings.

SUMMARY

The embodiments herein envisages a computer implemented system for delivering electronic content to a subscriber ahead-of-time. The system comprises a policy server configured to create a file access policy, the file access policy specifying at least a time period in which the electronic content is to be rendered accessible to the subscriber. The policy server embeds the file access policy with the electronic content, and generates embedded electronic content.

The system further includes an encryption module configured to encrypt the embedded electronic content, and generate encrypted electronic content. The encryption module transmits the encrypted electronic content, ahead of the time period specified by the file access policy, to a network enabled device accessible to the subscriber.

The system further includes a client processor cooperating with the network enabled device and the policy server, the client processor configured to decrypt the encrypted electronic content. Further, the client processor communicates with a time server to determine a current time stamp, and compares the current time stamp received from the time server with the time period specified by the file access policy. The client processor renders the encrypted electronic content accessible on the network enabled device, only in the event that the current time stamp is within the time period specified by the file access policy.

In accordance with the embodiments herein, the policy server is further configured to store at least a public key for authenticating the subscriber.

In accordance with the embodiments herein, the network enabled device is embedded with the private key corresponding to the public key stored in the policy server.

In accordance with the embodiments herein, the client processor is further configured to authenticate the subscriber by determining whether the private key embedded in the network enabled device corresponds to the public key stored in the policy server.

In accordance with the embodiments herein, the time period specified by the file access policy includes at least one of a first time stamp denoting the date and time after which the encrypted electronic content is rendered accessible on the network enabled device, a second time stamp denoting the date and time before the expiry of which the encrypted electronic content is rendered accessible on the network enabled device, and a time interval denoting the date and time between the first time stamp and the second time stamp.

In accordance with the embodiments herein, the client processor is further configured to render the encrypted electronic content accessible on the network enabled device accessible to the subscriber, only in the event that the current time stamp is within the date and time period specified by the file access policy.

The embodiments herein envisages a computer implemented method for delivering electronic content to a subscriber ahead-of-time. The method, in accordance with the embodiments herein comprises the following computer implemented steps:

creating a file access policy using a policy server, wherein the file access policy specifies at least a time period in which the electronic content is to be rendered accessible to the subscriber;

embedding the file access policy with the electronic content, using the policy server;

encrypting the electronic content embedded with the file access policy, using an encryption module and generating encrypted electronic content;

transmitting the encrypted electronic content, ahead of the time stamp specified by the file access policy, to a network enabled device accessible to the subscriber;

decrypting the encrypted electronic content received at the network enabled device;

authenticating the subscriber through the policy server;

communicating with a time server and determining a current time stamp;

comparing the current time stamp received from the time server and the time stamp specified by the file access policy; and rendering the encrypted electronic content accessible on the network enabled device, only in the event that the current time stamp is within the time period specified by the file access policy.

In accordance with the embodiments herein, the step of creating a file access policy includes the following steps:

creating a first time stamp, the first time stamp denoting the date and time after which the encrypted electronic content is rendered accessible on the network enabled device;

creating a second time stamp, the second time stamp denoting the date and time before the expiry of which the encrypted electronic content is rendered accessible on the internet enabled device;

selectively creating a time interval by combining the first time stamp and the second time stamp; and incorporating at least one of the first time stamp, the second time stamp and the time interval into the file access policy.

In accordance with the embodiments herein, the step of authenticating the subscriber further includes the following steps:

storing, at the policy server, a public key for authenticating the subscriber;

embedding onto the network enabled device, a private key corresponding to the public key stored in the authentication server; and authenticating the subscriber, at the policy server, by determining whether the private key embedded in the network enabled device corresponds to the public key stored in the policy server.

The embodiments herein envisages a computer readable non-transitory storage medium having computer readable instructions stored thereupon, the computer readable instructions when executed by a processor cause a computer enabled device to:

create a file access policy, the file access policy specifying at least a time period in which the electronic content is to be rendered accessible to the subscriber;

embed the file access policy with the electronic content;

encrypt the electronic content embedded with the file-access policy, and generate encrypted electronic content;

transmit the encrypted electronic content ahead of the time period specified by the file access policy, to a network enabled device accessible to a subscriber;

decrypt the encrypted electronic content received at the network enabled device;

communicate with a time server and determine a current time stamp;

compare the current time stamp received from the time server and the time stamp specified by the file access policy; and render the encrypted electronic content accessible on the network enabled device, only in the event that the current time stamp is greater than the time stamp specified by the file access policy.

In accordance with the embodiments herein, the computer readable instructions, when executed by the processor, further cause the computer enabled device to:

create a first time stamp, the first time stamp denoting the date and time after which the encrypted electronic content is rendered accessible on the network enabled device;

create a second time stamp, the second time stamp denoting the date and time before the expiry of which the encrypted electronic content is rendered accessible on the network enabled device;

selectively create a time interval by combining the first time stamp and the second time stamp; and access the public key necessary for authenticating the subscriber; and authenticate the subscriber by determining whether the public key corresponds to a private key embedded onto the network enabled device.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF ACCOMPANYING DRAWINGS

The other objects, features and advantages will occur to those skilled in the art from the following description of the preferred embodiment and the accompanying drawings in which:

FIG. 1 is a block diagram illustrating the functional components of the system for ahead-of-time delivery of electronic content, according to one embodiment herein.

Figure 2A:
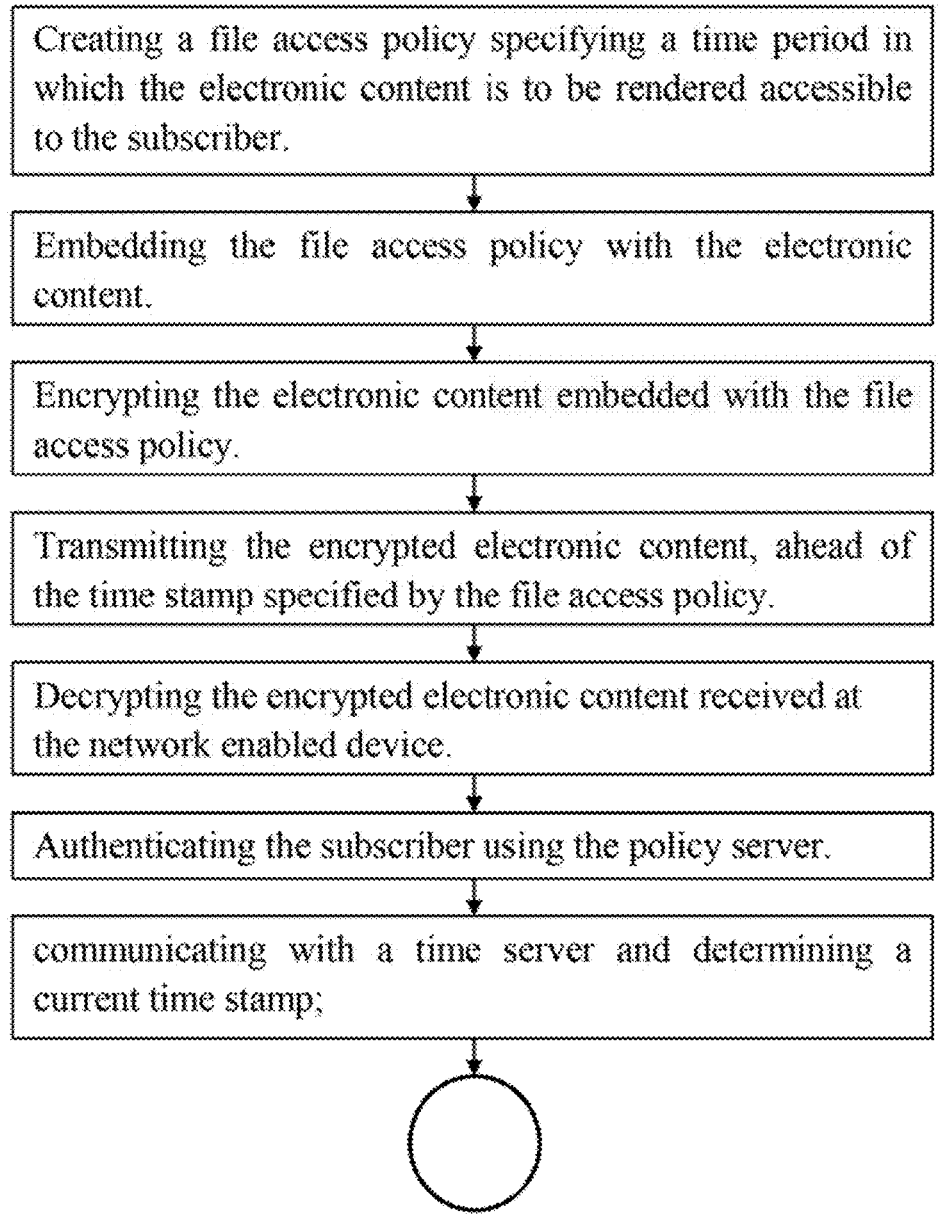
Figure 2B:
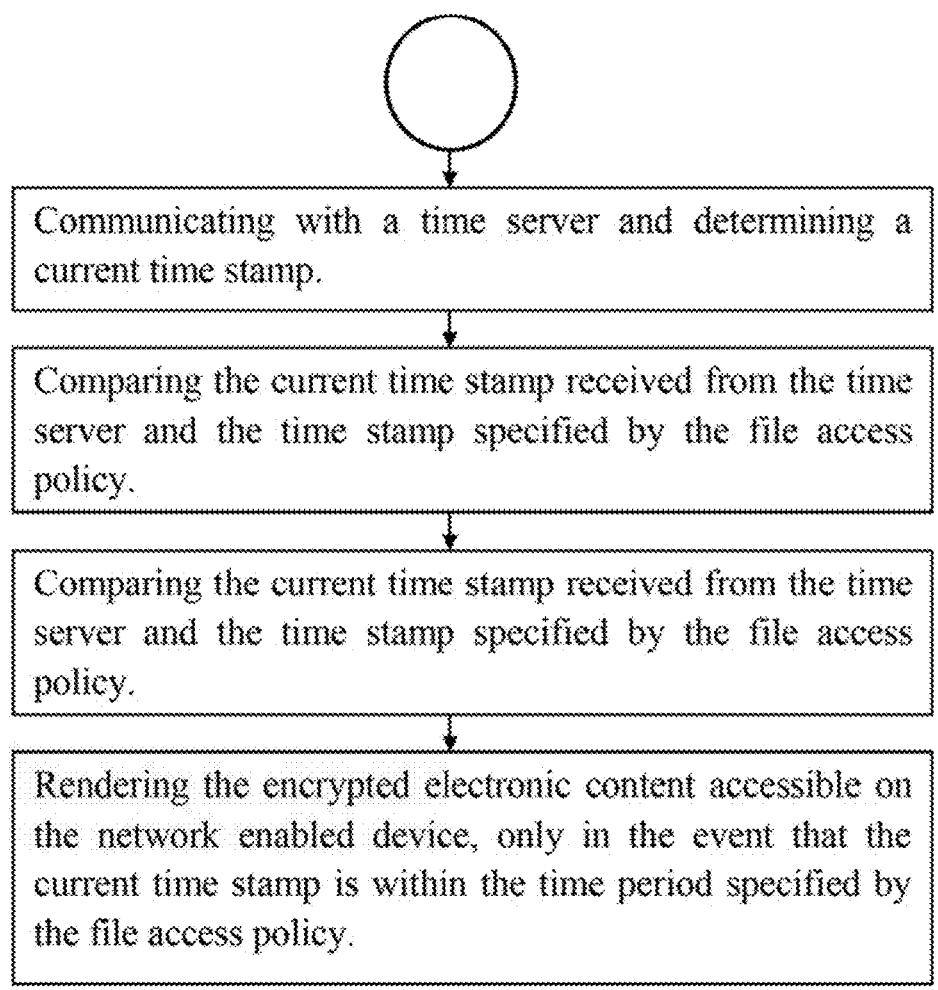

FIG. 2A and FIG. 2B combination illustrate a flow chart that includes the steps involved in the computer implemented method for ahead-of-time delivery of electronic content, according to one embodiment herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Referring to FIG. 1, there is shown a computer implemented system 100 which provides for electronic content to be delivered to the subscriber 10, ahead-of-time, according to one embodiment herein. The electronic content is typically shared with the subscriber 10 via an enterprise network, internet, a Virtual Private Network (VPN), and the like. The electronic content shared with the subscriber 10 could be originally stored in a corporate database, a file server, a Data Loss Prevention (DLS) server, and the like (collectively referred to as 'content source' hereafter and denoted by reference numeral 12).

In accordance with the embodiments herein, the system 100 encapsulates the electronic content in a file wrapper (not shown in figures), preferably using a file manipulation engine (not shown in figures). The file manipulation engine encapsulates the electronic content regardless of the native format of the electronic content. During encapsulation, the electronic content is preferably combined with a content usage policy, inter-alia. During encapsulation, the electronic content could also be encrypted using an encryption key to prevent unauthorized access. The phenomenon of encapsulating the electronic content preferably prior to transmission of the said electronic content has been described in elaborate detail in commonly assigned U.S. Pat. No. 8,909,925 titled 'System to Secure Electronic Content, Enforce Usage Policies and Provide Configurable Functionalities', the contents of which are incorporated herein by the way of reference.

In accordance with the embodiments herein, the system 100 includes a policy server denoted by reference numeral 14. The policy server 14 creates a file usage policy applicable to the electronic content to be transferred, ahead-of-time, to the subscriber 10. The file access policy created by the policy server 14 includes a time period inter-alia. The time period specified by the file access policy includes a first time stamp, or a second time stamp or a time interval denoted by the first time stamp and second time stamp respectively.

In the event that only a 'first' time stamp is present in the file access policy, the policy server 14 interprets the date and time denoted by the 'first' timestamp as the date and time at which/after the expiry of which, the electronic content is made accessible to the subscriber 10. In the event that only the 'second' time stamp is present in the file access policy, the policy server 14 interprets the date and time denoted by the 'second' timestamp as the date and time before the expiry of which, the electronic content is made accessible to the subscriber 10. In case if both the 'first' time stamp and 'second' time stamp are present in the file access policy, the date and time duration between the 'first' time stamp and 'second' time stamp is treated as a time interval, and the electronic content is made accessible to the subscriber 10 within the time interval.

In accordance with the embodiments herein, the system 100 further includes an encryption module 16 configured to encrypt the embedded electronic content (to be transmitted ahead-of-time, to the subscriber 10) using any of the known symmetric key encryption techniques. For example, the electronic content could be encapsulated using the encryption key(s) pre-stored in the header of the file wrapper. Alternatively, the header of the file wrapper can be incorporated with a gateway encryption key that leads to a secondary encryption key for multi-level encryption of the electronic content. Alternatively, the encryption module 16 cooperates with the policy server 14 to obtain the keys required for encryption.

The encrypted embedded electronic content is subsequently transmitted to a network enabled device 18 accessible to the subscriber 10, preferably after receiving a request from the subscriber 10 for the transfer of electronic content. Alternatively, the encrypted embedded electronic content could be transmitted to predetermined network enabled devices identifiable via a Subscriber Identification Module (SIM), an IP address, and the like. Alternatively, the encrypted embedded electronic content could be transmitted to a web based (for example, a Gmail user account, a Yahoo user account, a Face Book account and the like) account accessible to the subscriber, via the network enabled device 18.

In accordance with the embodiments herein, the encrypted embedded electronic content is transmitted to the network enabled device 18 ahead-of-time, i.e., ahead of the date and time specified by the time period of the file access policy. In accordance with the embodiments herein, the network enabled device 18 accessible to the subscriber 10, cooperates with a client processor denoted by the reference numeral 18. In a preferred embodiment of the embodiments herein, the client processor 20 is a part of the network enabled device 18. The client processor 20 is configured to decrypt the received encrypted embedded electronic content using any of the known symmetric key decryption techniques. For example, the electronic content could be decrypted using the decryption key(s) pre-stored in the header of the file wrapper. Alternatively, the client processor 20 cooperates with the policy server 14 to obtain the decryption keys required for decrypting the encrypted electronic content.

In accordance with the embodiments herein, the policy server 14 includes a database (not shown in figures) that stores the public key necessary for authenticating the subscriber 10. Further, the private key corresponding to the public key (stored in the database) is preferably embedded onto the network enabled device 18.

In accordance with the embodiments herein, when the embedded encrypted electronic content is transmitted to the network enabled decide 18, the client processor 20 authenticates the subscriber 10 (having access to the network enabled device 18). The subscriber 10 is preferably prompted to provide at least one of a username/password combination, digital signature and personal security certificate. Alternatively, the client processor 20 communicates to the policy server 14, the pre-stored user-identification information corresponding to the subscriber 10 and authenticates the subscriber 10 on the client-side. The phenomenon of authenticating a user (subscriber) has been described in elaborate detail in commonly assigned U.S. Pat. No. 8,909, 925 titled 'System to Secure Electronic Content, Enforce Usage Policies and Provide Configurable Functionalities', the contents of which are incorporated herein by the way of reference.

In accordance with the embodiments herein, subsequent to the authentication of the subscriber 10, the client processor 20 communicates with the policy server 14 to access the file access policy stored thereupon. Subsequent to accessing the file access policy, the client processor 20 determines the date and time provided by the 'first' timestamp. In the event that the 'second' timestamp is also included in the file access policy, the client processor 20 determines the date and time provided by the 'second' timestamp as well. In the event that only the 'second' timestamp is included in the file access policy, the client processor 20 determines the date and time provided by the 'second' timestamp. Subsequently the client processor 20 accesses a time server 22, preferably a trusted time server 22, to determine the current date and time. In accordance with the embodiments herein, the client processor 20 synchronizes with the time server at predetermined time intervals, to determine the current date and time.

Subsequently, the client processor 20 compares the current date and time with the date and time specified by the 'first' timestamp of the file access policy. The client processor 20 renders the electronic content accessible on the network enabled device 18 of the subscriber 10, only in the event that the current time stamp (identified by the way of communication with the time server 22) is greater than or equivalent to the time stamp specified by the file access policy. Alternatively, the client processor 20 renders the electronic content accessible, in the event that the current time stamp (identified by the way of communication with the time server 22) is lesser than or equivalent to the date and time specified by the 'second' time stamp. In the event that both 'first' time stamp and 'second' time stamp are included in the file access policy, the client processor 20 determines the date and time specified by the 'first' timestamp as well as the 'second' timestamp, and subsequently computes a time interval having the lower limit specified by the 'first' timestamp and the upper limit specified by the 'second' timestamp. Subsequently, the client processor 20 renders the electronic content accessible, in the event that the current time stamp (identified by the way of communication with the time server 22) is within the computed time interval.

Referring to the combination of FIG. 2A and FIG. 2B, there is shown a flowchart illustrating the steps involved in the computer implemented method for delivering electronic content to a subscriber ahead-of-time, according to one embodiment herein. At step 200, a file access policy is created using a policy server. The file access policy specifies at least a time period at which the electronic content is to be rendered accessible to the subscriber. At step 202, the file access policy is embedded with the electronic content to be transmitted to the subscriber. At step 204, the electronic content embedded with the file access policy is encrypted and encrypted electronic content is generated. At step 206, the encrypted electronic is transmitted ahead-of time, ahead-of-time period specified by the file access policy, to a network enabled device accessible to the subscriber. At step 208, the encrypted electronic content received by the network-enabled device is decrypted. Preferably, a client processor cooperating with the network enabled device decrypts the encrypted electronic content. At step 210, the subscriber accessing the network enabled device is authenticated, preferably by the client processor. At step 212, the client processor communicates with a time server and determines a current time stamp. At step 214, the client server compares the current time stamp received from the time server, with the time period specified by the file access policy. At step 216, the encrypted electronic content is rendered accessible on the network enabled device, only in the event that the current time stamp is within the time stamp specified by the file access policy.

In accordance with the embodiments herein, the step (200) of creating a file access policy includes the steps of creating a first time stamp, creating a second time stamp, selectively creating a time interval by combining the first time stamp and the second time stamp, and incorporating at least one of the first time stamp, the second time stamp and the time interval into the file access policy. In accordance with the embodiments herein, the first time stamp denotes the date and time after which the encrypted electronic content is rendered accessible on the network enabled device of the subscriber. In accordance with the embodiments herein, the second time stamp denotes the date and time before the expiry of which the encrypted electronic content is rendered accessible on the network enabled device.

In accordance with the embodiments herein, the step (210) of authenticating the subscriber further includes the following steps: storing, at the policy server, a public key for authenticating the subscriber; embedding onto the network enabled device, a private key corresponding to the public key stored in the authentication server; and authenticating the subscriber by determining whether the private key embedded in the network enabled device corresponds to the public key stored in the policy server.

The embodiments herein envisages a non transitory computer readable storage medium having computer readable instructions stored thereupon, the computer readable instructions when executed by a processor, cause a computer enabled device to:
create a file access policy, the file access policy specifying at least a time period in which the electronic content is to be rendered accessible to the subscriber;
embed the file access policy with the electronic content;
encrypt the electronic content embedded with the file-access policy, and generate encrypted electronic content;
transmit the encrypted electronic content ahead of the time period specified by the file access policy, to a network enabled device accessible to a subscriber;
decrypt the encrypted electronic content received at the network enabled device;
communicate with a time server and determine a current time stamp;
compare the current time stamp received from the time server and the time stamp specified by the file access policy; and
render the encrypted electronic content accessible on the network enabled device, only in the event that the current time stamp is greater than the time stamp specified by the file access policy.

In accordance with the embodiments herein, the computer readable instructions, when executed by the processor, further cause the computer enabled device to:
create a first time stamp, the first time stamp denoting the date and time after which the encrypted electronic content is rendered accessible on the network enabled device;
create a second time stamp, the second time stamp denoting the date and time before the expiry of which the encrypted electronic content is rendered accessible on the network enabled device;
selectively create a time interval by combining the first time stamp and the second time stamp; and
access the public key necessary for authenticating the subscriber; and
authenticate the subscriber by determining whether the public key corresponds to a private key embedded onto the network enabled device.

The technical advantages of the system and method envisaged by the embodiments herein include the following. The system envisaged by the embodiments herein transmits information to the intended recipients, ahead-of-time. The system renders the transmitted information accessible only at a pre-determined future time. The system envisaged by the embodiments herein employs a time synchronized authentication mechanism for identifying and authorizing intended content recipients. The system envisaged by the embodiments herein provides for centralized authorization policy management. The system envisaged by the embodiments herein executes a time synchronized authentication mechanism on a standalone client device irrespective of the time stamps locally generated by the client device.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented system for delivering electronic content to a subscriber, ahead-of-time, said system comprising:
    a policy server configured to create a file access policy, said file access policy specifying at least one of a first time stamp, a second time stamp, and a time period, said time period representative of time duration between said first time stamp and said second time stamp, in accordance with at least, one of which the electronic content is to be rendered accessible to the subscriber, said policy server further configured to authenticate the subscriber, embed said file access policy with the electronic content, and generate embedded electronic content;
    an encryption module configured to encrypt the embedded electronic content, and generate encrypted electronic content, said encryption module further configured to transmit said encrypted electronic, content, ahead of at least one of said first time stamp, said second time stamp and said time period, to a network enabled device accessible to the subscriber; and
    a client processor cooperating with said network enabled device and said policy server, said client processor configured to decrypt the encrypted electronic content, said client processor configured to communicate with a time server to determine a current time stamp, said client processor further configured to analyze the file access policy, said client processor further configured to:
    compare said first time stamp with said current time stamp in the event that only the first time stamp is specified by said file access policy;
    compare said second time stamp with said current time stamp in the event that only the second time stamp is specified by said file access policy;
    compare said time period representative of time duration between said first time stamp and said second time stamp, with the current time stamp, in the event that said first time stamp and said second time stamp are specified by said file access policy;
    render the encrypted electronic content accessible on the network enabled device when only said first time stamp is specified by said file access policy and said current time stamp is greater than said first time stamp;
    render the encrypted electronic content accessible on die network enabled device when only said second time stamp is specified by said file access policy and said current time stamp is within said second time stamp; and
    render the encrypted electronic content accessible on the network enabled device, in the event that the current time stamp is within the time period specified by the file access policy.

2. The system as claimed in claim 1, wherein said policy server is further configured to store at least a public key for authenticating the subscriber.

3. The system as claimed in claim 1, wherein the network enabled device is embedded with the private key corresponding to the public key stored in the policy server.

4. The system as claimed in any one of the claims 1, 2 and 3, wherein the client processor is further configured to authenticate the subscriber by determining whether the private key embedded in the network enabled device corresponds to the public key stored in the policy server.

5. The system as claimed in claim 1 wherein said client processor is further configured to render the encrypted electronic content accessible on the network enabled device accessible to the subscriber, only in the event that the current time stamp is within the date and time period specified by said file access policy.

6. A computer implemented method for delivering electronic content to a subscriber ahead-of-time, said method comprising the following computer implemented steps:
    creating a file access policy using a policy server, wherein said file access policy specifies at least one of a first time stamp, a second time stamp, and a time period, said time period representative of time duration between said first time stamp and said second time stamp in accordance with at least one of which the electronic content is to be rendered accessible to the subscriber;
    embedding said file access policy with the electronic content, using said policy server, to generate embedded electronic content;
    encrypting the embedded electronic content using an encryption module to generate encrypted electronic content;
    transmitting said encrypted electronic content, ahead of at least one of said first time stamp, said second time stamp and said time period, to a network enabled device accessible to the subscriber;
    decrypting the encrypted electronic content received at the network enabled device;
    authenticating the subscriber through the policy server;
    communicating with a time server to determine a current time stamp;
    comparing said first time stamp with said current time stamp in the event that only the first time stamp is specified by said file access policy;
    comparing said second time stamp with said current time stamp in the event that only the second time stamp is specified by said file access policy;
    comparing said time period representative of time duration between said first time stamp and said second time stamp with the current time stamp in the event that said first time stamp and said second time stamp are specified by said file access policy;
    rendering the encrypted electronic content accessible on the network enabled device when only said first time stamp is specified by said file access policy and said current time stamp is greater than said first time stamp;
    rendering the encrypted electronic content accessible on the network enabled device when only said second time stamp is specified by said file access policy and said current time stamp is within said second time stamp; and rendering the encrypted electronic content accessible on the network enabled device in the event that the current time stamp is within the time period specified by the file access policy.

7. The method as claimed in claim 6, wherein the step of creating a file access policy includes the following steps:

incorporating said first time stamp into said file access policy, said first time stamp denoting a date and time after which the encrypted electronic content is rendered accessible on the network enabled device;

incorporating said second time stamp into said file access policy, said second time stamp denoting a date and time before the expiry of which the encrypted electronic content is rendered accessible on the network enabled device;

representing said time period as a time duration between said first time stamp and second time stamp, said time period indicative of a date and time within which the encrypted electronic content is rendered accessible on the network enabled device, and incorporating said time period into said file access policy.

8. The method as claimed in claim 6, wherein the step of authenticating the subscriber further includes the following steps:

storing, at the policy server, a public key for authenticating the subscriber;

embedding onto said network enabled device, a private key corresponding to the public key stored in said authentication server; and authenticating the subscriber, at the policy server, by determining whether the private key embedded in the network enabled device corresponds to the public key stored in the policy server.

9. A computer readable non-transitory storage medium having computer readable instructions stored thereupon, said computer readable instructions when executed by a processor, cause a computer enabled device to:

create a file access policy using a policy server, wherein said file access policy specifies at least one of a first time stamp, a second time stamp, and a time period, said time period representative of time duration between said first time stamp and said second time stamp in accordance with at least one of which the electronic content is to be rendered accessible to the subscriber;

embed said file access policy with the electronic content using said policy server, to generate embedded electronic content;

encrypt the embedded electronic content using an encryption module to generate encrypted electronic content;

transmit said encrypted electronic content ahead of at least one of said first time stamp, said second time stamp and said time period, to a network enabled device accessible to the subscriber;

decrypt the encrypted electronic content received at the network enabled device;

authenticate the subscriber through the policy server;

communicate with a time server to determine a current time stamp;

compare said first time stamp with said current time stamp in the event that only the first time stamp is specified by said file access policy;

compare said second dine stamp with said current time stamp in the event that only the second time stamp is specified by said file access policy;

compare said time period representative of time duration between said first time stamp and said second time stamp with the current lime stamp in the event that said first time stamp and said second time stamp are specified by said file access policy;

render the encrypted electronic content accessible on the network enabled device when only said first time stamp is specified by said file access policy and said current time stamp is greater than said first time stamp;

render the encrypted electronic content accessible on the network enabled device when only said second time stamp is specified by said file access policy and said current time stamp is within said second time stamp; and render the encrypted electronic content accessible on the network enabled device in the event that the current time stamp is within the time period specified by the file access policy.

10. The computer readable non-transitory storage medium as claimed in claim 9, wherein said computer readable instructions, when executed by the processor, further cause the computer enabled device to:

incorporate said first time stamp into the file access policy, said first time stamp denoting the date and time after which the encrypted electronic content is rendered accessible on the network enabled device;

incorporate said second time stamp into the file access policy, said second time stamp denoting the date and time before the expiry of which the encrypted electronic content is rendered accessible on the network enabled device;

incorporate a time period into said file access policy, said time period representative of a time duration between said first time stamp and second time stamp, said time period indicative of a date and time within which the encrypted electronic content is rendered accessible on the network enabled device;

access the public key necessary for authenticating the subscriber;

authenticate the subscriber by determining whether the public key corresponds to a private key embedded onto the network enabled device.

\* \* \* \* \*